Patented Feb. 1, 1949

2,460,742

UNITED STATES PATENT OFFICE 2,460,742

METHOD OF BREAKING UP FOAMED BLAST FURNACE SLAG AND OTHER SMELTS

Marcel Gallai-Hatchard, Cheam, England

No Drawing. Application June 3, 1947, Serial No. 752,276. In Great Britain April 18, 1946

Section 1, Public Law 690, August 8, 1946

1 Claim. (Cl. 49—77.5)

This invention has for its object to provide an improved method of breaking up foamed blast furnace slag and other smelts into pieces of convenient size.

The invention is a development arising out of the invention covered by patent application No. 534,840, filed May 9, 1944, for "Improved method for the production of porous slags or other smelts," and which issued as Patent No. 2,443,103 on June 8, 1948. According to the Specification of the said patent the foaming of molten slag or other smelts is effected on a porous bed to which water is supplied under control from below by a system of pipes and jets embedded in the porous bed. The product is a carpet of crude foam, which is left on the bed to solidify, to temper to the required hardness and to cool, whereupon it is removed by various means, such as grabs, or skimmers, or even by man-power, to be subsequently crushed and graded by traditional mechanical crushing and screening methods into a light-weight aggregate for use in the production of light weight concrete and for other uses.

For brittle materials such as foamed slag, the method of crushing requires very careful consideration if the production of a great excess of fine grading, i. e. pulverisation, is to be avoided. Apart from these considerations, the major capital outlay for the installation and operation of a traditional foamed slag production plant is absorbed by the crushing and screening devices.

During full-scale foaming tests I have made for the practical application and development of the invention covered by patent application No. 534,840, filed May 9, 1944, I have discovered that, if, after the completion of the foaming and solidification of the foamed carpet, this carpet—while still in a glowing or very hot condition—is chilled by water entering from underneath through the identical water jet system as devised for the actual foaming, the water will partly or fully break up the carpet according to the quantity of water applied and its precise mode of application.

In short, and as a result of my discovery, the method and apparatus described and claimed in the specification of patent application No. 534,840, filed May 9, 1944, can fulfill three distinct and separate functions, to wit:

(a) Foam the molten slag or smelt and produce a carpet of crude foam;

(b) Allow for undisturbed solidification and hardening of the foamed carpet;

(c) Break up the solidified foamed carpet by sudden chilling into aggregate of various gradings without any other mechanical means and thus without the production of that undue quantity of fines which is inherent in all methods of mechanical crushing.

The present invention is based on the aforesaid discovery.

Briefly stated, the invention resides in a method of breaking up foamed blast furnace slag and other smelts, which method comprises subjecting a mass or carpet of the foamed slag or the like while it is still glowing or sufficiently hot, to the effect of a chilling medium or of chilling media suchwise as to cause the mass or carpet to contract suddenly and in consequence thereof to break up into pieces of useful sizes.

Stated in another way, the invention provides for the breaking up of the foam, while still glowing or sufficiently hot and thus contracting, by the effect of a chilling medium or of chilling media applied from below or from top or from any other suitable direction, into aggregate of a useful range of gradings.

Water will normally be used for the breaking up process, for the same reason that it will normally be used for the foaming step, it then being possible to utilise, for carrying out the process of the present invention, the same apparatus as that described and claimed in the specification of patent application No. 534,840, filed May 9, 1944. To this end, after water has been supplied to the jets arranged in the foaming bed or beds, in a quantity sufficient to effect the foaming step and the mass of foamed slag has solidified, further water is supplied to the jets while the slag is still glowing or sufficiently hot so as suddenly to chill the mass and thereby cause it to break up into pieces. The size of the pieces will depend upon the quantity of water supplied for the purpose in question and as the quantity can be regulated with the apparatus referred to, it will be appreciated that the extent of breaking-up, and consequently the size of the resultant pieces, can also be controlled according to requirements.

In place of the water jets, chilling may be effected by the provision of a separate closed pipe system embedded in the foaming bed and which contains a liquid supplied, in controlled quantity, from a refrigerating plant. In this case the broken up product will be dry as compared with the wet product resulting from the application of water as the chilling medium.

There should be an interval of time between the application of water for foaming and the application of the chilling medium for breaking up the foam, that is to say, the two steps should be applied separately and not merged into one. The length of time between the two stages will depend upon the nature of the foam produced and on other considerations, provided it is always observed that the chilling medium is applied when the foam has become sufficiently set but yet remains hot enough for this medium to have the desired effect.

With the advent of the present invention, and by utilising the foaming apparatus described in the specification of patent application No. 534,840, filed May 9, 1944, this apparatus has the entirely novel attribute in the art of foaming slags and smelts, that it will not only function for complete foaming but will also replace and considerably improve upon, accelerate and cheapen the function of crushing. In short, it will act as a combined foaming and crushing plant, producing a product in many ways better and more desirable than that resulting from the use of hitherto known apparatus, at a fraction of the costs previously involved.

The substance of the present invention, namely, to use water, or other chilling media, for the breaking up of crude foam, can be applied to foam produced otherwise than with the aid of a foaming bed containing water jets. Thus, the crude foam may be collected in pits or treated in beds for the purpose of the invention, after leaving the particular foaming apparatus employed, so long as it is still in a glowing or sufficiently hot condition for the chilling step to have the desired effect.

I claim:

Method of producing blast furnace slag and other smelts in foamed and broken up condition, comprising the steps of pouring the molten smelt into a container having a bottom constructed of porous material, introducing water through the said bottom so as to have the bottom saturated with water prior to the pouring of the molten smelt which on being poured forms an initially foamed carpet or layer on the said bottom, introducing additional water through the porous bottom to complete the foaming of the smelt, ceasing the water supply, leaving the carpet or layer of foamed smelt to solidify and anneal on the porous bottom and then, while the solidified carpet or layer is still glowing or hot, introducing further water through the porous bottom to cause a chilling and sudden contraction of the carpet or layer whereby it will be broken up into pieces of foamed smelt of useful size.

MARCEL GALLAI-HATCHARD.

REFERENCES CITED

The following references are of record in the file of this patent:

UNITED STATES PATENTS

| Number | Name | Date |
| --- | --- | --- |
| 1,163,605 | Schol | Dec. 7, 1915 |